J. F. O'CONNOR.
HAND BRAKE.
APPLICATION FILED APR. 3, 1919.
1,361,481. Patented Dec. 7, 1920.
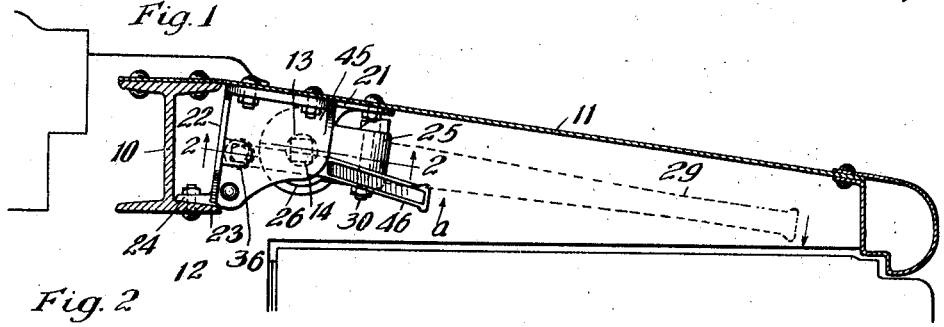
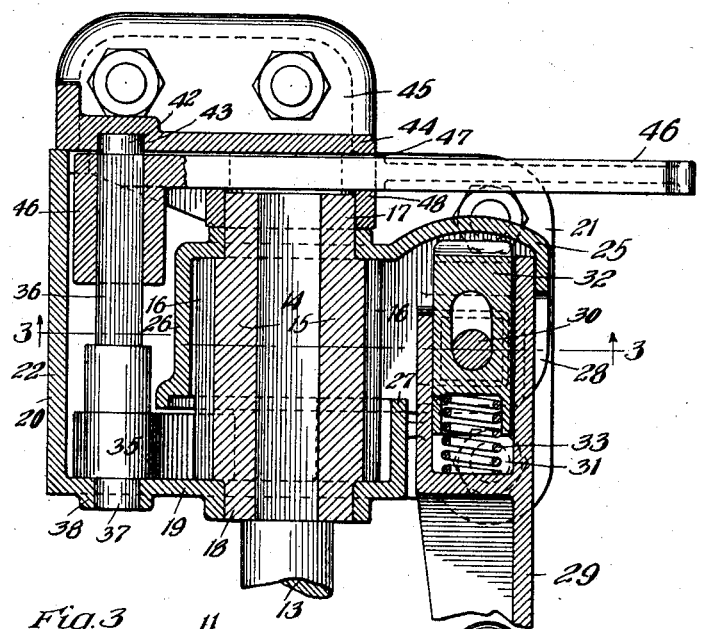
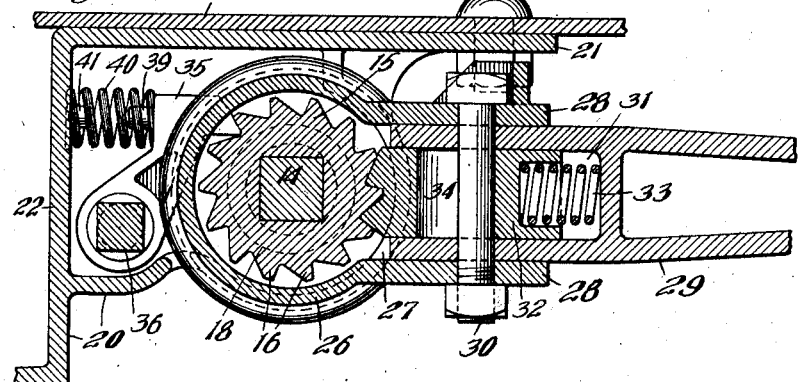
WITNESSES:
Wm. Geiger
INVENTOR.
John F. O'Connor
BY George J. Haight
his ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

HAND-BRAKE.

1,361,481. Specification of Letters Patent. Patented Dec. 7, 1920.

Application filed April 3, 1919. Serial No. 287,176.

*To all whom it may concern:*

Be it known that I, JOHN F. O'CONNOR, a citizen of the United States, residing at Chicago, in the county of Cook and State of Illinois, have invented a certain new and useful Improvement in Hand-Brakes, of which the following is a full, clear, concise, and exact description, reference being had to the accompanying drawings, forming a part of this specification.

This invention relates to improvements in hand brakes.

In the use of hand brakes on railway cars, particularly hand brakes used on passenger car equipment, the brakes are frequently located in cramped quarters necessitating a compact arrangement of the operative parts of the brake in order to avoid parts of the brake obstructing the passageway or interfering with the movement of the passengers on the platform or within the vestibule.

The object of my invention is to provide an improvement in hand brakes especially adapted for passenger car equipment which arrangement is exceedingly compact and permits of the brake being located in a small space of peculiar form such as ordinarily encountered on vestibuled passenger cars. The invention is in the nature of an improvement on the hand brake disclosed in Charles E. Dath Patent 1,300,351, granted April 15, 1919.

In the drawings forming a part of this specification, Figure 1 is a horizontal, sectional view at the end of a vestibuled passenger car showing my improvements in connection therewith. The section illustrates substantially one-half of the end of the car. Fig. 2 is an enlarged vertical, sectional view taken substantially on the line 2—2 of Fig. 1. And Fig. 3 is a horizontal, sectional view taken substantially on the line 3—3 of Fig. 2.

In said drawing, 10 denotes an I-beam such as usually found on a vestibuled passenger car and employed to form one side post of the passageway leading from the vestibule of one car to another car. The sheet metal extreme end of the vestibule is indicated at 11, and 12 indicates the vestibule floor or platform. As is customary in passenger car equipment, the hand brake is located in the corner formed by one of the door posts and the end wall of the vestibule and, as will be understood, the brake must be so designed and positioned that there will be no parts projecting unduly into the vestibule. I have shown my improved brake applied in the usual place and, as shown, the brake is of the pawl and ratchet type adapted to be manually operated.

The vertical brake staff is indicated at 13 and the same has a squared or other non-circular upper end as indicated at 14 over which is slipped a ratchet wheel casting designated 15. Said casting 15 has a series of vertically elongated peripheral ratchet teeth 16 and at its upper and lower ends is provided with round bearings as indicated at 17 and 18. The lower bearing end 18 is journaled in a corresponding opening provided in the lower wall 19 of a housing bracket 20. The latter has a vertical web 21 secured to the wall 11 of the vestibule and is provided with another web 22 at right angles to the web 21 bridging the space between the end wall 11 and flange 23 of the I-beam post 10. The bracket 19 is provided with lugs 24 by which it is secured to said flange 23 of the I-beam.

Loosely rotatably mounted on the ratchet wheel casting 15 is a housing or cap 25 having a depending flange 26 which extends over the greater part of the ratchet wheel 15 and coöperates with an upstanding curved flange 27 on the bracket 19 to entirely house the ratchet wheel 15. At one side, the casing or cap 25 is provided with laterally extended flanges indicated at 28—28 between which is pivoted the upper end of a normally depending operating handle 29. The pivotal connection is performed by a bolt 30 extending through suitable perforations in the upper forked end of the handle 29 as clearly indicated in Figs. 2 and 3. Said upper end of the handle 29 is provided with a substantially rectangular socket 31 in which is slidably mounted a pawl 32 normally pressed to its outermost limit by a spring 33 in the bottom of said socket 31. The pawl 32 has an elongated opening 34 through which said bolt 30 extends and limits the outward movement of said pawl but permits the latter to be retracted within the socket as the pawl slips over the ratchet teeth 16. This will be evident from an inspection of Fig. 3. As heretofore explained, the handle 29 depends vertically under the influence of gravity. When it is desired to operate the brake, the operator lifts the handle 29 to a horizontal position as shown by the dotted lines in Fig. 1 which causes the pawl 32 to engage with the ratchet wheel 15. The handle 29 is then oscillated back and forth in a horizontal plane, thus effecting the rotation of the staff 13 and tightening of the brake chain.

In order to hold the staff and ratchet wheel 15 against reverse or backward rotation during the braking operation, I provide a locking dog indicated at 35 in Fig. 3. This dog is mounted on a square stud shaft 36 near the lower end thereof as shown in Fig. 2. The extreme lower end of the shaft 36 is round as indicated at 37 and extends into a suitable bearing 38 formed in the lower web of the bracket 19. The vertical height of the dog 35 is made such that it will readily pass under the lower edge of the flange 26 of the cap 25 and engage the ratchet teeth 16. On the back of the dog 35 a stud 39 is formed over which is seated one end of a spring 40, the other end of the spring being seated on the corresponding stud 41 formed on the inner face of the web 22. As will be evident, the spring 40 normally holds the dog 35 in operative relation with the ratchet wheel 15. Said shaft 36 is extended upwardly and at its top end is formed with another journal section indicated at 42, the same being seated in a suitable bearing 43 formed on the under face of a horizontal flange 44 of a cap plate 45. The cap plate 45 is bolted or otherwise rigidly secured to the end wall 11 of the vestibule. Rigidly associated with the shaft 36 is a dog operating release lever 46 which is extended outwardly through a suitable opening 47 in a depending section of the cap plate 45, as shown in Fig. 2. Said depending section of the cap plate provides a bearing 48 for the upper end of the ratchet wheel as clearly shown in the same figure. By oscillating the lever 46 in a direction indicated by the arrow $a$ in Fig. 1, it is evident that the dog 35 can be disengaged from the ratchet wheel and the brake released.

The entire construction is unusually compact and can be placed in the small spaces usually provided on vestibule passenger car equipment.

I claim:

1. In a brake of the character described, the combination with a vertical brake staff and pawl and ratchet mechanism for rotating the staff step-by-step, of a bearing bracket for said staff, a spring-controlled pivotally mounted locking dog mounted on said bracket, and a manually operable release lever for said dog extended over the upper end of the staff.

2. In a brake of the character described, the combination with a vertical brake staff having a ratchet wheel thereon, and a gravity-controlled, pivotally mounted pawl operating lever coöperable with said ratchet wheel when the lever is in horizontal position, of a supporting bracket forming a bearing for said staff, a spring-controlled locking dog pivotally mounted on said bracket and coöperable with said ratchet wheel, a shaft on which said locking dog is carried and extended vertically, a release lever rigid with said shaft, the release lever being extended horizontally over the top of the ratchet wheel, and a cap plate extending over said release lever, ratchet wheel, staff and shaft and providing a bearing for the upper end of the shaft.

In witness that I claim the foregoing I have hereunto subscribed my name this 21st day of Feb., 1919.

JOHN F. O'CONNOR.

Witness:
CARRIE GAILING.